United States Patent [19]
Bolle et al.

[11] Patent Number: 5,995,640
[45] Date of Patent: Nov. 30, 1999

[54] SYSTEM AND METHOD FOR DETERMINING IF A FINGERPRINT IMAGE CONTAINS AN IMAGE PORTION REPRESENTING A DRY FINGERPRINT IMPRESSION

[75] Inventors: Rudolf Maarten Bolle, Bedford Hills; Sharathchandra Umapatirao Pankanti, Mt. Kisco; Yi-Sheng Yao, Scarsdale, all of N.Y.

[73] Assignee: International Business Machines Corporation, Armonk, N.Y.

[21] Appl. No.: 08/735,721

[22] Filed: Oct. 23, 1996

[51] Int. Cl.$^6$ ........................................... G06K 9/00
[52] U.S. Cl. ........................... 382/124; 382/125; 382/272
[58] Field of Search .................................. 382/124, 125, 382/126, 116, 274, 266, 263, 272; 283/68, 69, 78; 356/71; 340/825.34

[56] References Cited

U.S. PATENT DOCUMENTS

| | | | |
|---|---|---|---|
| 4,151,512 | 4/1979 | Riganati et al. | 382/125 |
| 4,310,827 | 1/1982 | Asai | 382/125 |
| 4,574,393 | 3/1986 | Blackwell et al. | 382/125 |
| 4,728,186 | 3/1988 | Eguchi et al. | 356/71 |
| 4,752,966 | 6/1988 | Schiller | 382/125 |
| 4,817,183 | 3/1989 | Sparrow | 382/125 |
| 4,896,363 | 1/1990 | Taylor et al. | 382/125 |
| 4,936,680 | 6/1990 | Henkes et al. | 356/71 |
| 4,947,442 | 8/1990 | Tanaka et al. | 382/2 |
| 5,067,162 | 11/1991 | Driscoll, Jr. et al. | 382/5 |
| 5,109,428 | 4/1992 | Igaki et al. | 382/5 |
| 5,140,642 | 8/1992 | Hsu et al. | 382/4 |
| 5,142,592 | 8/1992 | Moler | 382/199 |
| 5,189,482 | 2/1993 | Yang | 356/71 |
| 5,271,064 | 12/1993 | Dhawan et al. | 382/6 |
| 5,392,367 | 2/1995 | Hsu et al. | 382/228 |
| 5,420,937 | 5/1995 | Davis | 382/1 |
| 5,442,672 | 8/1995 | Bjorkholm et al. | 378/124 |
| 5,524,070 | 6/1996 | Shin et al. | 382/27 |
| 5,524,161 | 6/1996 | Omori et al. | 382/125 |
| 5,524,162 | 6/1996 | Levien | 382/54 |
| 5,613,014 | 3/1997 | Eshera et al. | 382/124 |
| 5,631,971 | 5/1997 | Sparrow | 382/125 |
| 5,631,972 | 5/1997 | Ferris et al. | 382/125 |
| 5,709,746 | 1/1998 | Ballard | 118/31.5 |
| 5,719,958 | 2/1998 | Wober et al. | 382/199 |
| 5,737,071 | 4/1998 | Arndt | 382/124 |

OTHER PUBLICATIONS

N. K. Ratha, S. Chen and A. K. Jain, "Adaptive Flow Orientation–Based Feature Extraction in Fingerprint Images," Pergamon, Pattern Recognition, vol.28, No.11, pp. 1657–1672, 1995.

B. M. Mehtre, "Fingerprint Image Analysis for Automatic Identification," R and D Division, CMC Limited, 115 Sarojini Devi Road, Secunderabad–500 003, India, Machine Vision and Application Springer–Verlag 1993.

D. H. Ballard and Christopher M. Brown, "Computer Vision—Region Growing," Department of Computer Science, University of Rochester, Rochester, NY, Prentice-Hall, Inc., Englewood Cliffs, NJ 07632, pp. 149–150, 1982.

*Primary Examiner*—Christopher S Kelley
*Assistant Examiner*—Sheela Chawan
*Attorney, Agent, or Firm*—Louis J. Percello

[57] ABSTRACT

A fingerprint image is divided into blocks of pixels. The blocks are also determined to be within the foreground or background of the image. A dryness process determines a mean intensity of pixels within each foreground block, a second mean intensity of pixels for those pixels whose intensities are smaller than the mean intensity, a standard deviation of intensities of all pixels within the respective foreground block, and a contrast measure being a function of a first ratio of the second mean intensity to the standard deviation. A comparator that determines that the foreground block is a dry block if the contrast measure is larger than a dryness threshold and that the image is a dry image if a second ratio of the number of dry blocks to total number of foreground blocks is larger than a third dryness threshold.

18 Claims, 14 Drawing Sheets

SYSTEM AND METHOD FOR DETERMINING IF A FINGERPRINT IMAGE CONTAINS AN IMAGE PORTION REPRESENTING A DRY FINGERPRINT IMPRESSION

FIELD OF THE INVENTION

This invention relates to the field of image processing. More specifically, the invention relates to a system and method for processing fingerprint images and detecting dry fingerprint images.

BACKGROUND OF THE INVENTION

There exist systems that accomplish automatic verification or identification of a person using his/her fingerprint. A fingerprint of a person comprises a distinctive and unique ridge pattern structure. For identification/verification purposes, ridge pattern structure could be characterized by endings and bifurcations of the individual ridges. These features are popularly known as minutiae. An example fingerprint is shown in FIG. 1A. The minutiae for the fingerprint shown in FIG. 1A are shown in Figure 1B as being enclosed by "boxes". For example, box 101B shows a bifurcation minutia of a bifurcated ridge 101A in FIG. 1A and box 103B shows a ridge ending minutia of ridge 103A in FIG. 1A. Note that minutiae on the ridges in fingerprints have directions (also called orientations) 105 associated with them. The direction of the minutia at a ridge end 103B is the direction in which the end of the ridge points. The direction of a bifurcation minutia 101B is the direction in which the bifurcated ridge points. Minutiae also have locations which are the positions of the minutiae on the fingerprint with respect to some coordinate system.

The prevalent methods of fingerprint identification and verification methods are based on minutiae features. These systems need to process the fingerprint images to obtain accurate and reliable minutiae features to effectively determine or verify the identity of a person.

FIG. 2 is a flow chart showing the steps generally performed by a typical prior art system 200.

In step 210, the image is acquired. This acquisition of the image could either be through a CCD camera and framegrabber interface or through a document scanner communicating with the primary computing equipment.

Once the image is acquired into the computer memory or onto disk, relevant features minutia features are extracted (220). Not all of the features thus extracted are reliable. Some of the unreliable features are optionally pruned (step 230), e.g., manually edited. The resultant reliable features are used for matching two fingerprint images (step 240). That is, matching the acquired fingerprint image with stored minutiae representations of previously acquired fingerprint images.

In semi-automatic systems, the unreliable features could be manually pruned visually by a human expert before the minutiae are used for matching (step 240). The fingerprint feature extraction, pruning, and matching system constitute the primary backbone of a typical minutiae-based automatic fingerprint identification systems (AFIS). The matching results are typically verified by a human expert (step 260 in FIG. 2). The verification may also be performed automatically. The following reference describes examples of the state of the prior art:

Nalini K. Ratha and Shaoyun Chen and Anil K. Jain, Adaptive flow orientation based texture extraction in fingerprint images, Pattern Recognition, vol. 28, no. 11, pp. 1657–1672, November, 1995.

This reference is incorporated herein by reference in its entirety.

FIG. 3 is a flow chart showing the prior art steps performed by a feature extraction process that are similar to some of the feature extraction proposed by Ratha, Jain, and Chen in the article mentioned above.

It is often not desirable to directly use the input fingerprint image for feature extraction. It might need an enhancement or preprocessing before one could further extract minutiae. Typically, a smoothing process is employed to reduce the pixel-wise noise (step 305).

After the preprocessing stages, prior art systems find the directions of the ridge flow (step 310). The next important step in the processing is finding the exact location of the finger in the image, a process referred to as the foreground/background segmentation (step 315). Once the finger is localized, the next step is to extract the ridges from the finger image (step 320). The ridges thus extracted are thick and might contain some noisy artifacts which do not correspond to any meaningful structures on the finger. The small structures could be safely removed (step 325). The longer structures are thinned to one-pixel width and then processed to remove any other artifacts using morphological operators (step 330). The locations and orientations of ridge endings and bifurcations are then extracted from the thinned structures (step 335) to obtain the minutiae. In some systems, post-processing 340 is performed on the extracted minutiae.

STATEMENT OF PROBLEMS WITH THE PRIOR ART

Some prior art systems fail to correctly image fingerprints that have scars or other imperfections. Also, some prior art fails to overcome problems with optics, lighting and image acquisition (e.g., finger contact). Accordingly, there are a large number of poor quality images produced by these systems. Therefore, these systems are not effective because the matching based on these poor quality features is poor. It is therefore critical to design an automatic scheme which examines the quality of an acquired fingerprint image before it is processed so that fingerprints with poor quality caused by conditions like dryness or smudging can thereafter be identified and rejected.

For instance, FIG. 4A is a prior art drawing of a typical fingerprint 400 of poor quality. Specifically, region 410A is smudged. This smudging is common in fingerprints and can be caused by excessive pressure, sweat, excess ink, skin diseases, etc. Figure 5A is a prior art drawing of another typical fingerprint of poor quality. Region 510A is caused by dryness of the finger in which case very little impression is produced in the image. Other reasons for poor quality regions include: poor optics, poor illumination, motion blur, etc. FIGS. 4B and 5B are prior art drawings of the unreliable minutia that result from the poor quality fingerprint in FIGS. 4A and 5A, respectively. Both images have excess minutiae (410B, 510B) from the smudging 410A and from the dryness 510A. These "noisy" fingers result in a number of unreliable minutiae, i.e., the minutiae do not uniquely identify their respective fingerprint and therefore can not be reliably matched to minutiae in a database that were extracted from an image of the same fingerprint.

OBJECTS OF THE INVENTION

An object of this invention is an accurate and reliable fingerprint image preprocessing system that detects dry fingerprint images.

An object of this invention is an accurate and reliable fingerprint image preprocessing system that quantifies fingerprint image quality.

Another object of this invention is an accurate and reliable fingerprint image pre-processing system that quantifies fingerprint image quality and detects images of poor quality due to dry fingers.

SUMMARY OF THE INVENTION

The invention is a computer system and method that determines a quality measure and dryness of a fingerprint image by dividing the image into blocks of pixels. (The invention permits the blocks to be created by down sampling pixels from the original image.) The blocks are determined to be within the foreground or background of the image. One embodiment of the invention makes these determinations by summing the intensity differences between the pixels in the block and their neighbors along one or more directions to classify the pixels as either foreground or background pixels. Blocks with over a threshold number of background pixels are background blocks, the other blocks are foreground blocks.

A dryness process determines a mean intensity of pixels within each foreground block, a second mean intensity of pixels for those pixels whose intensities are smaller than the mean intensity, a standard deviation of intensities of all pixels within the respective foreground block, and a contrast measure being a function of a first ratio of the second mean intensity to the standard deviation. A comparator determines that the foreground block is a dry block if the contrast measure is larger than a dryness threshold and that the image is a dry image if a second ratio of the number of dry blocks to total number of foreground blocks is larger than a third dryness threshold.

In a preferred embodiment, even if the contrast measure is smaller than the dryness threshold, the foreground block is identified a dry block if a variation in the contrast measure of two or more neighboring blocks is greater than a second dryness threshold

BRIEF DESCRIPTION OF THE DRAWINGS

The foregoing and other objects, aspects and advantages will be better understood from the following detailed description of preferred embodiments of the invention with reference to the drawings that include the following.

DETAILED DESCRIPTION OF THE INVENTION

Figure 1A:
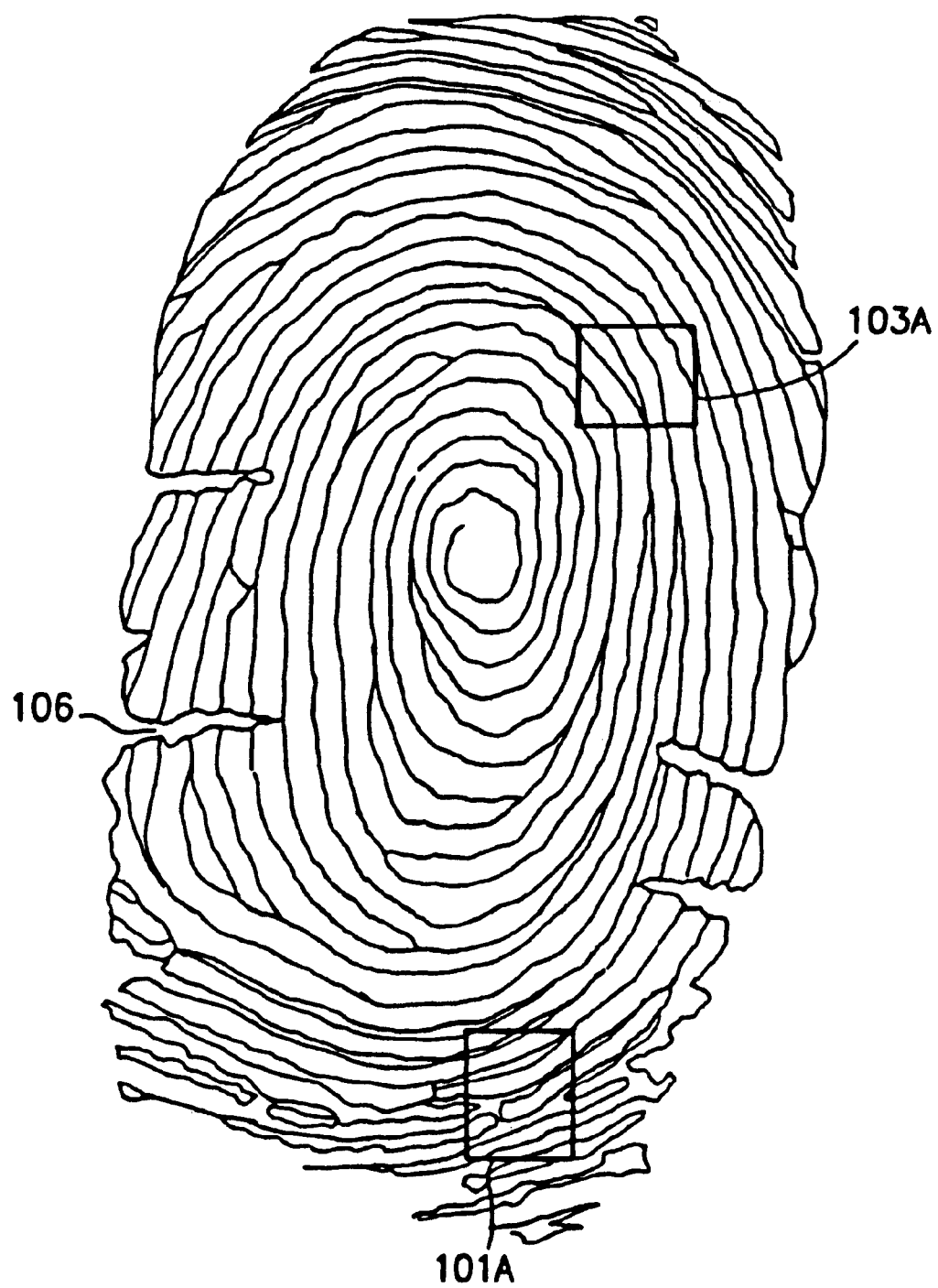
FIG. 1A is a prior art drawing of a typical fingerprint.
Figure 1B:
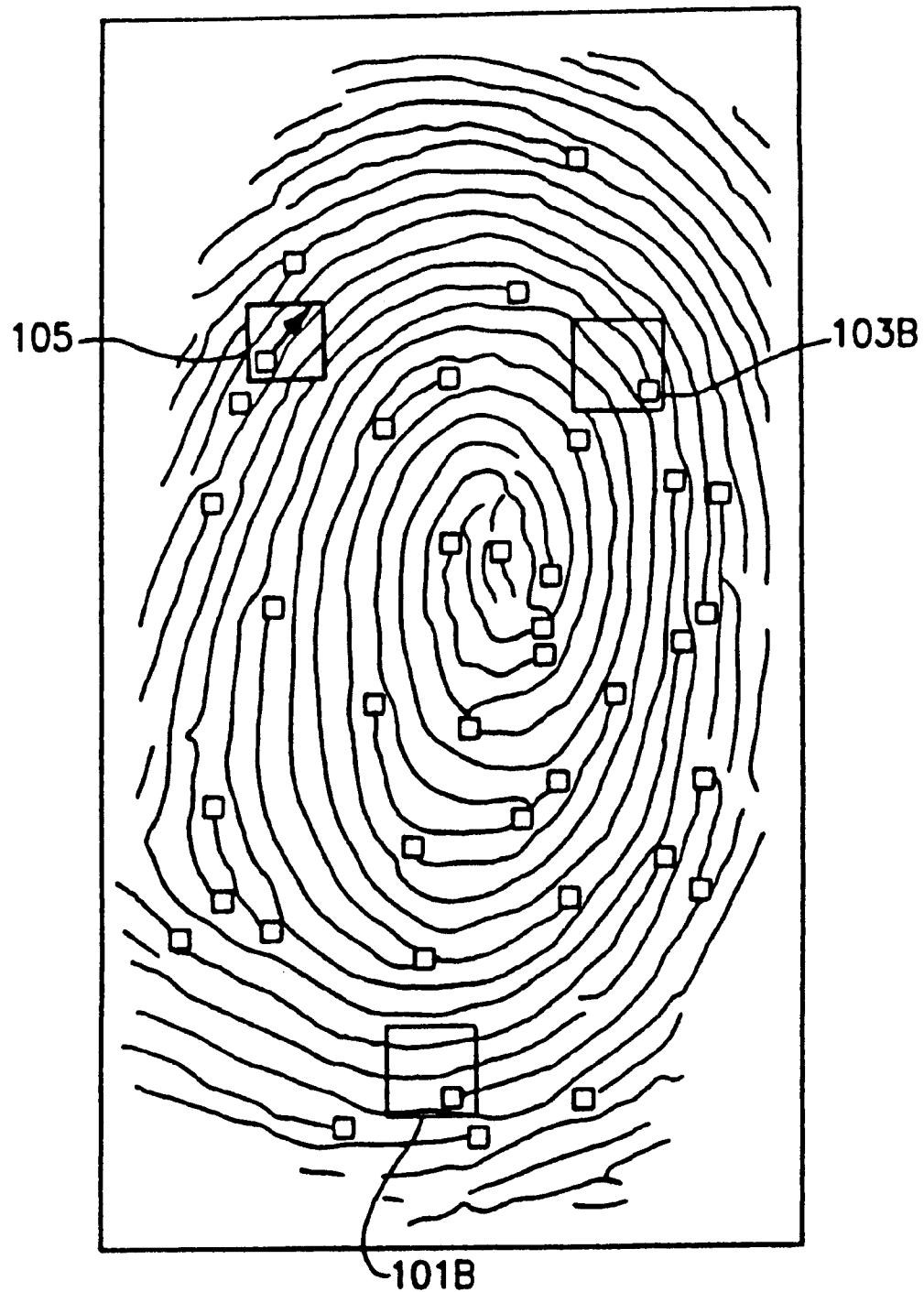
FIG. 1B is a prior art drawing showing minutia of the fingerprint in FIG. 1A.
Figure 2:
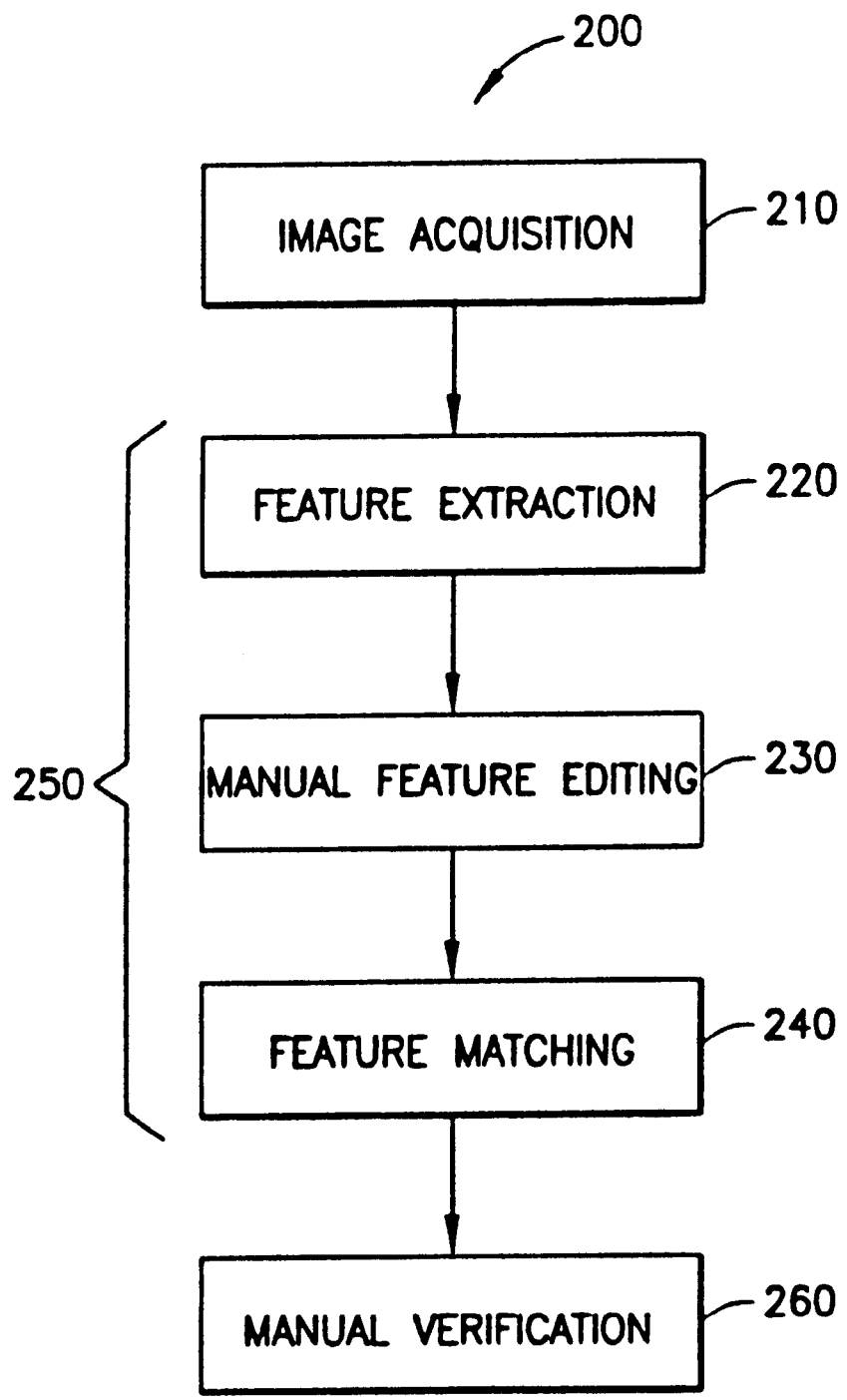
FIG. 2 is a flow chart showing the method steps performed by a typical prior art system.
Figure 3:
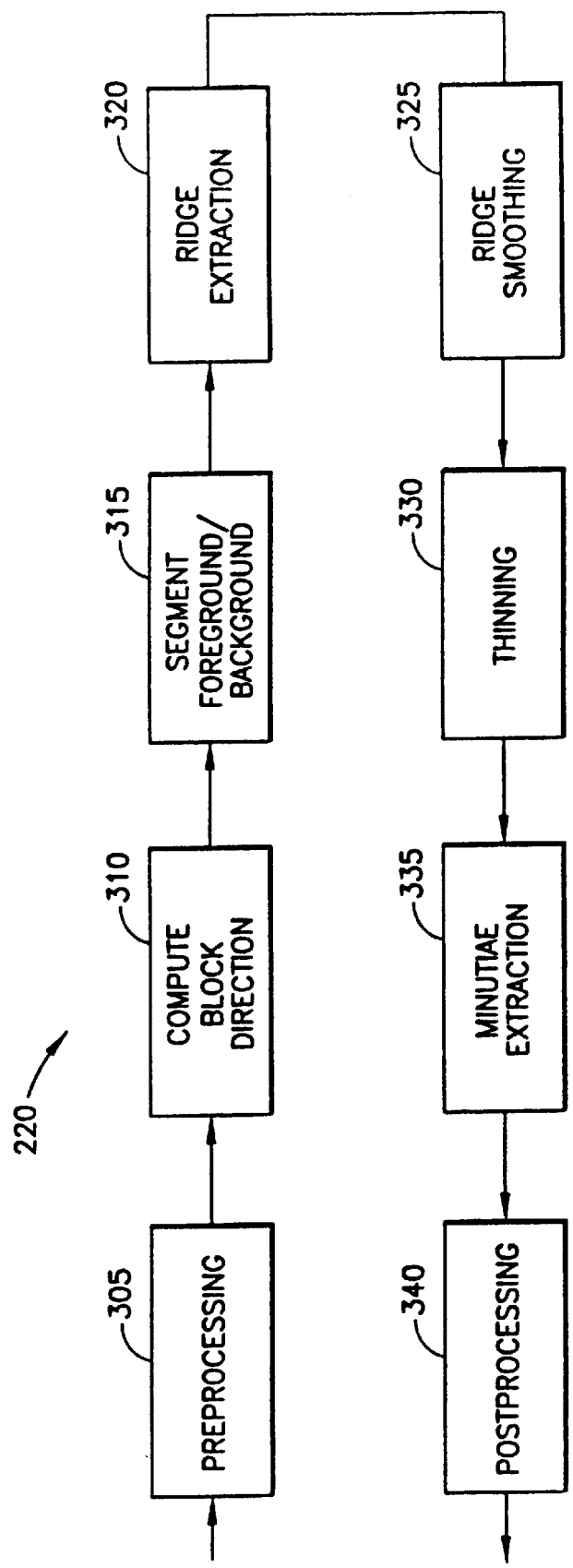
FIG. 3 is a flow chart showing the prior art steps performed by an feature extraction process.
Figure 4A:
FIG. 4A is a prior art drawing of a typical smudged fingerprint of poor quality.
Figure 4B:
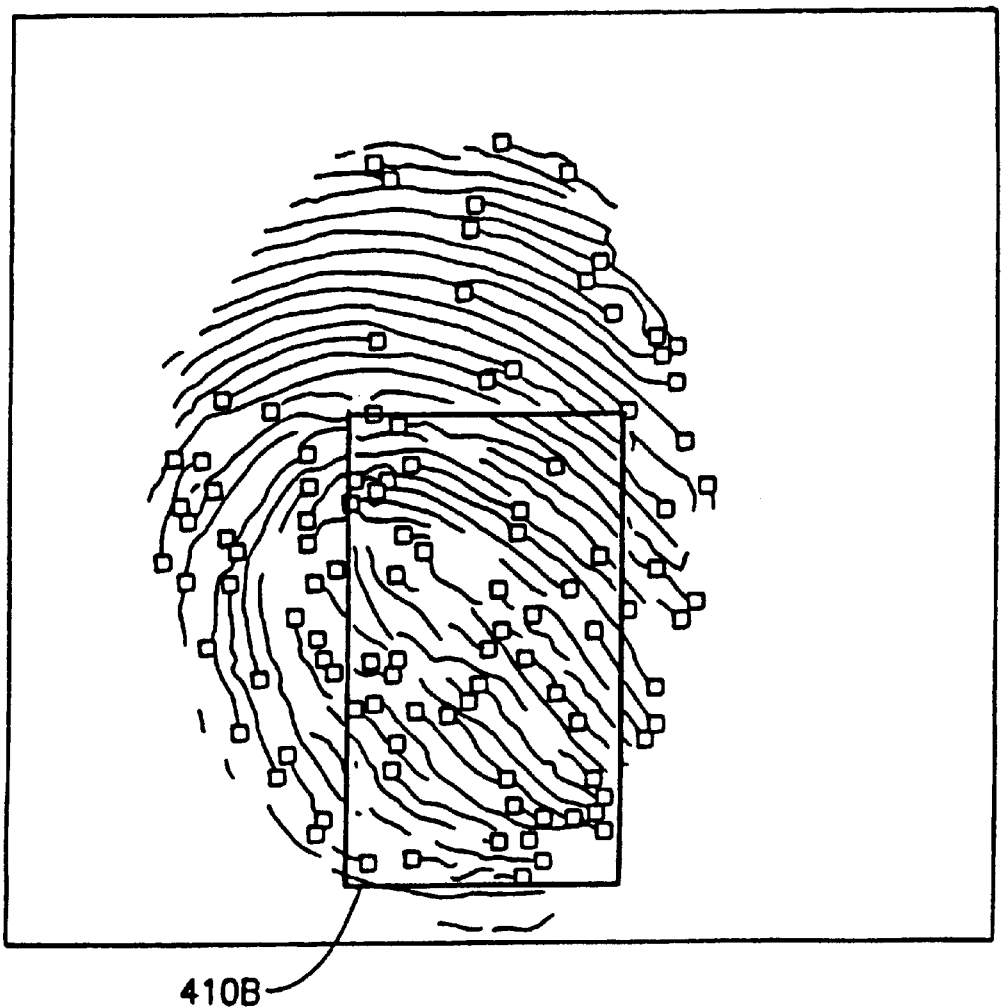
FIG. 4B is a prior art drawing of the unreliable minutia that result from the poor quality fingerprint in FIG. 4A.
Figure 5:
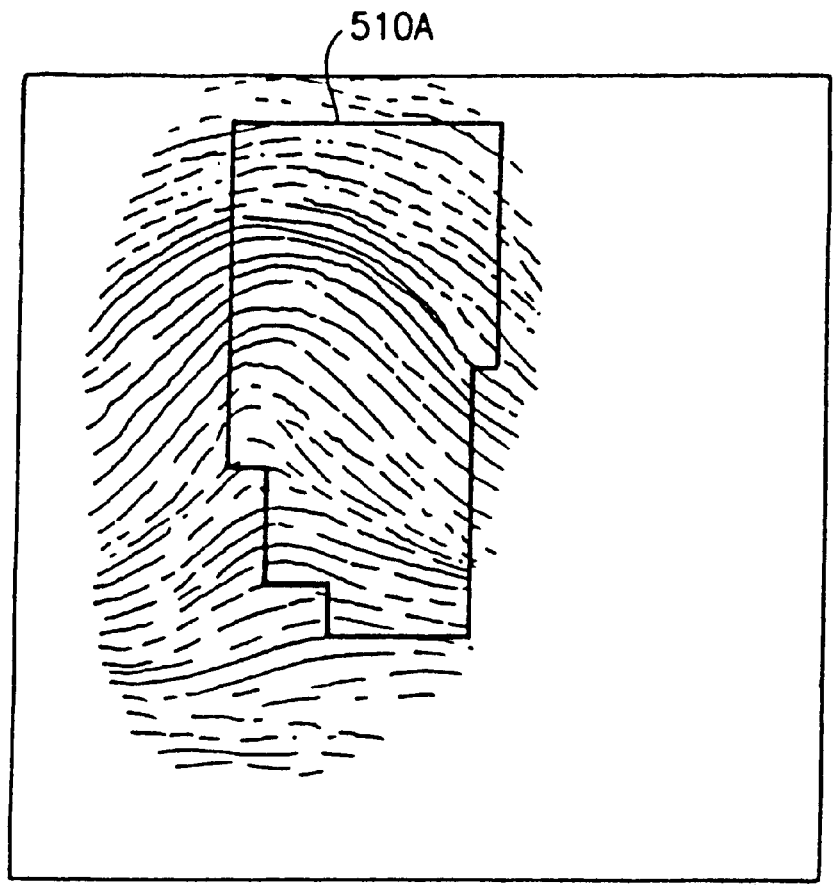
FIG. 5 is a prior art drawing of a typical dry fingerprint with poor quality.
Figure 6:
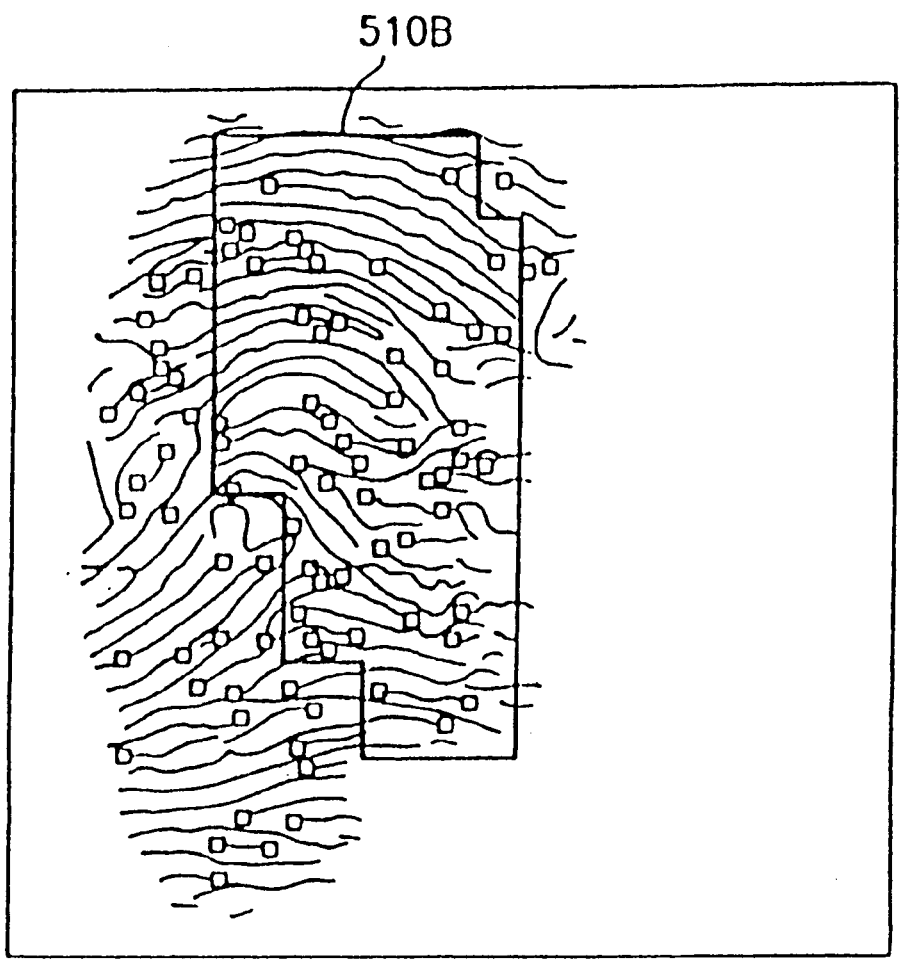
FIG. 6 is a prior art drawing of the unreliable minutia that result from the poor quality fingerprint in Figure 5A.
Figure 7:
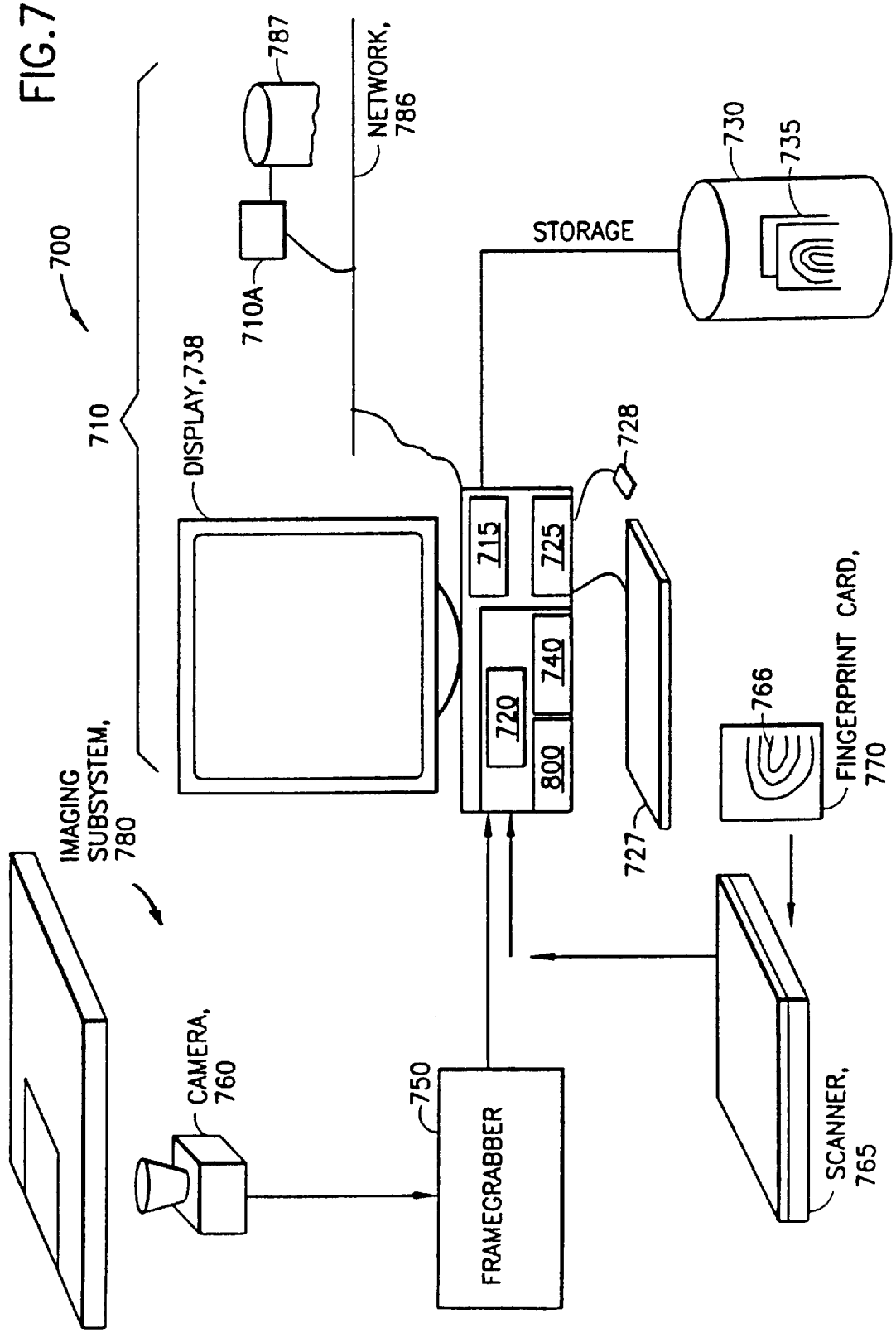
FIG. 7 is a block diagram of one preferred embodiment of the present system.

Referring now to the drawings, and more particularly to FIG. 7, there is shown the block diagram representation of a general computer hardware environment that is used as the image processing system 700. This computer 710 may be one of International Business Machines Corporation (IBM) Personal System/2 (PS/2) family of Personal Computers, a RISC System/6000, or Power Parallel System (SP/x), or equivalent. The system 700 includes one or more central processing units (CPU) 715, which may conform to any general computer architecture (e.g., Intel or a reduced instruction set microprocessor.) The CPU 715 is attached to a system bus (not shown) to which are attached a read/write and/or random access memory (RAM) 720 that can include one or more cache memories, a read only memory (ROM) 740, and an input/output adapter 725. The RAM 720 provides temporary storage for one or more application program processes 800 (FIG. 8) containing code and/or data while the ROM typically includes the basic input/output system (BIOS) code. Direct Access Storage Devices (DASDs), here represented by hard disk drive 730, are also connected to the CPU by appropriate adapter (not shown.) The hard disk drive 730 typically stores the computer's operating system (OS), such as IBM's OS/2 operating system, and various application programs, data, and/or databases. These databases include intermediate results and fingerprint image data 735. Typically, the input/output adapter 725 has attached to it a keyboard 727, a mouse 728, and/or other user interface devices (not shown).

The system 700 also can include a display 738, here represented as a cathode ray tube (CRT) display but which may be a liquid crystal display (LCD) or other suitable display and/or graphic user interface (GUI) 738. The display 738 is connected to the system bus via a display adapter.

The computer 710 is also interfaced with a framegrabber 750 and an image acquisition device, e.g., a camera 760, arrangement to capture the fingerprint image into the computer memory/disk. Alternatively, the computer might be communicating with a document scanning device 765 that scans the fingerprint image 766 from a document 770 like an inked fingerprint card 770. Any other known means can be used to enter a fingerprint image to the memory 735, e.g., transmitting an image over a network 786 to the system 700 from another computer 710A, e.g., a server 710A, that is connected to the network 786 and has access to one or more databases 787.

The hardware for system 700 and equivalents of these systems are well known to those skilled in the art.

Personal System/2, PS/2, OS/2, RISC System/6000, Power Parallel System, SP/x, and IBM are trademarks of the International Business Machines Corporation.

Figure 8:
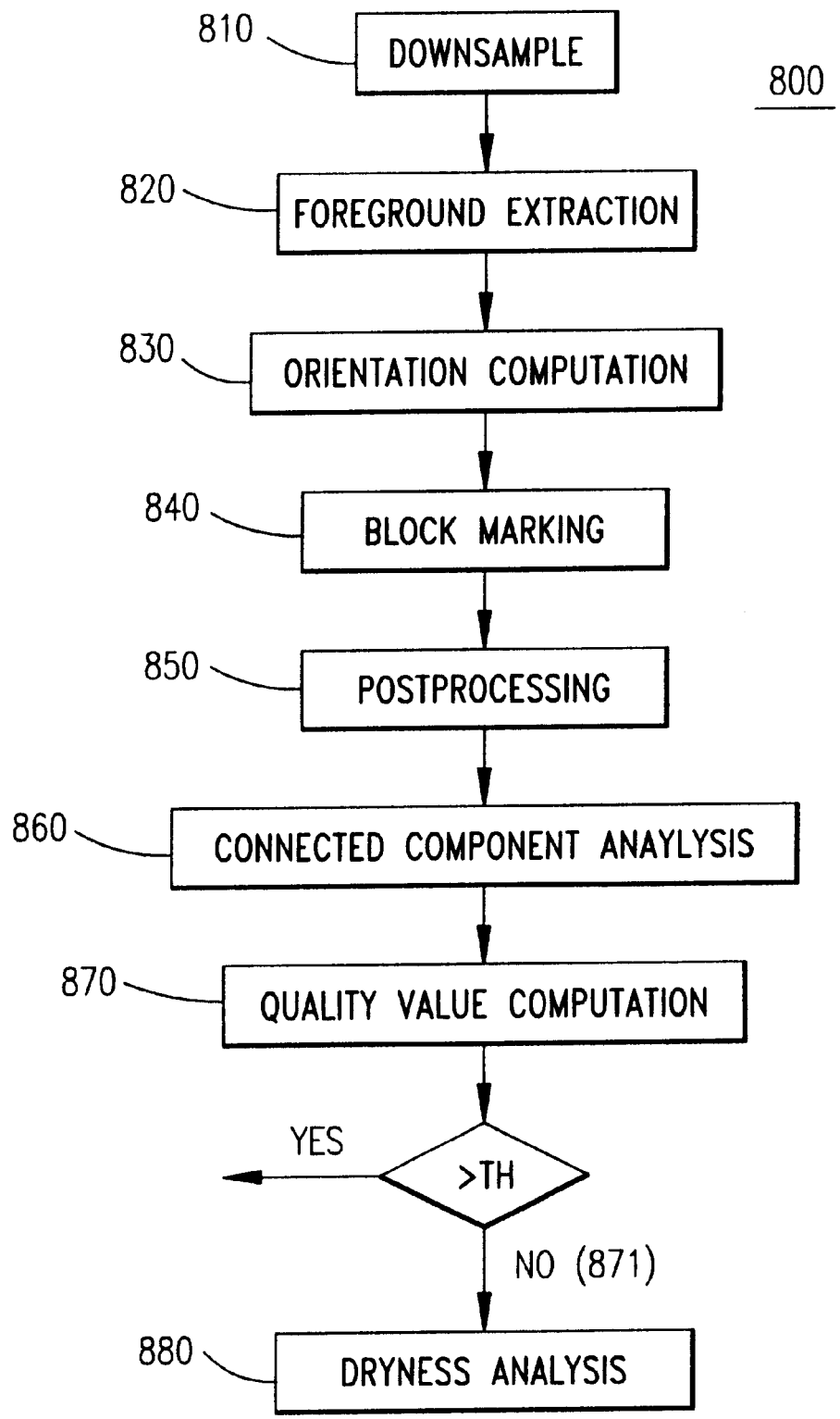
FIG. 8 is a flow chart showing the steps performed by the fingerprint quality checker.

FIG. 8 is a flow chart showing the steps of the novel fingerprint image dryness and quality checker 800.

Given a fingerprint image, e.g., 766, a reduced size image is first obtained at step 810. In a preferred embodiment, the accessed image is reduced to one forth the actual image size to reduce the number of pixels in the image. The invention can determine quality using reduced size images and therefore allows for reduced storage usage and faster processing times.

In this embodiment, one pixel is selected (subsampled) out of 4, e.g., the upper left pixel is selected to represent the four pixels in every 2×2 matrix of pixels on the image. Therefore, the input fingerprint image is reduced by a factor of two in both directions. For the determination of the quality of a fingerprint image, the subsampled pixels are sufficiently representative of the original image; the information lost in this step is negligible.

In one embodiment, step 820 extracts (segments) the fingerprint image from the background using known techniques.

Then step 830 selects a block of (representative) pixels from the extracted foreground fingerprint image 820 (e.g., of the reduced image 810). For instance, a block is 8×8 (representative) pixels. Then a block direction is determined (i.e., orientation) from the block. In a preferred embodiment, the block direction of a given block is determined as follows: each pixel in the block is assigned a direction based on the direction in which the brightness variation is minimum; the block direction, then, is determined by the direction of the majority of pixels in the block. In a more preferred embodiment, each pixel is assigned one of the four directions closest to the direction in which the brightness variation is minimum. For example, in a block with 64 pixels, each pixel has one of the following orientations (directions): 0, 45, 90, and 135 degrees (with respect to a given frame of reference). If, for example, more pixels have an orientation of 45 degrees than any other pixel orientation, the block direction (orientation) is chosen to be 45 degrees. To be chosen in a preferred embodiment as the prominent block direction, the direction of more than half of the pixels in the block has to be the same. If the block does not contain more than half of its pixels in a given direction, the block is marked as having no prominent direction. See the following reference:

B. M. Mehtre, Fingerprint Image Analysis for Automatic Identification, Machine Vision and Applications, Springer-Verlag, vol. 6, pp. 124–139, 1993.

which is herein incorporated by reference in its entirety.

Figure 8A:
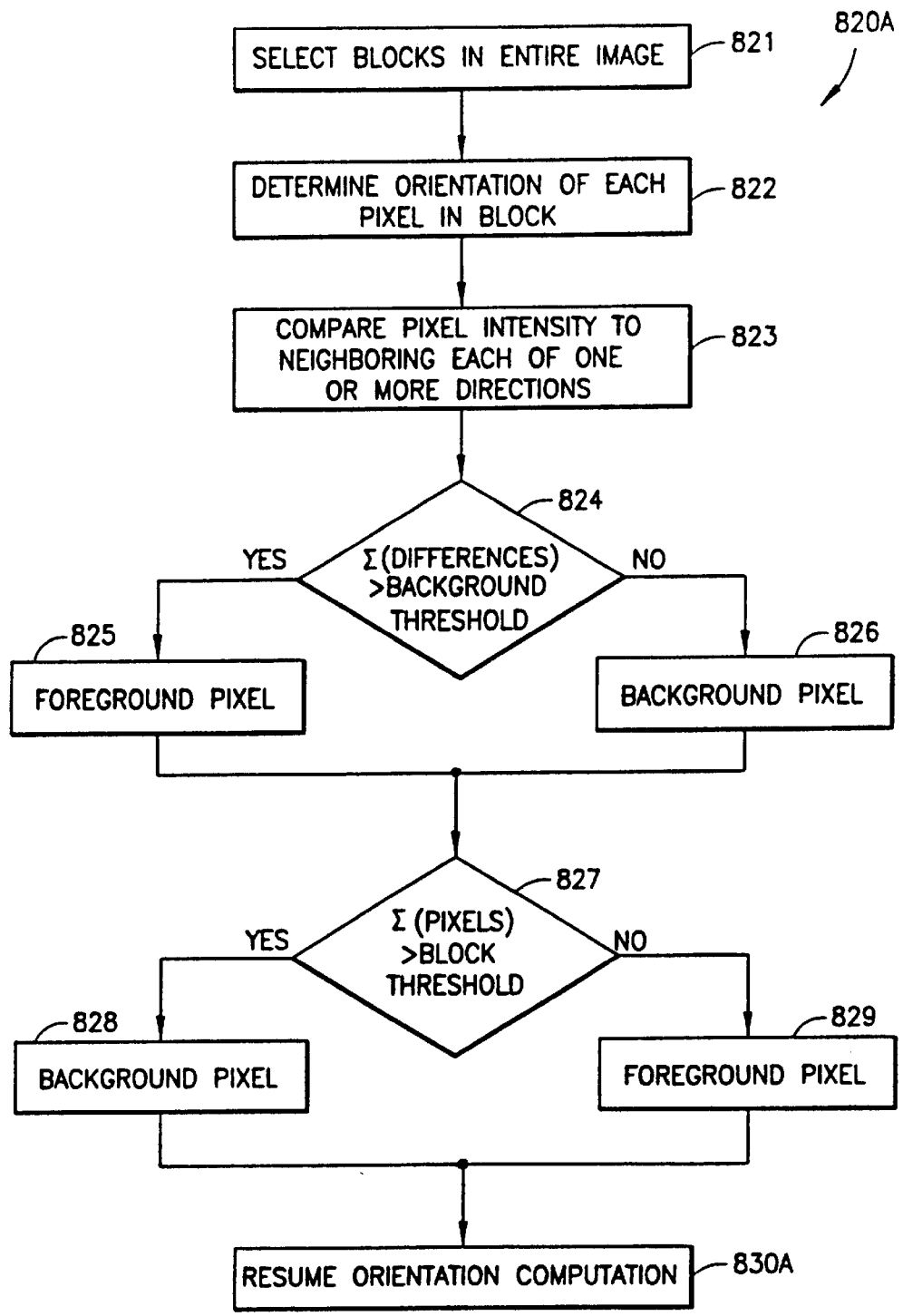
FIG. 8A is a flow chart showing a preferred embodiment of image segmentation and block direction determination.

In a preferred embodiment, steps 820 and 830 are combined as shown in process 820A in FIG. 8A. In this process 820A the direction extraction and segmentation are novelly combined.

Process 820A (FIG. 8A) performs both the foreground and background segmentation of step 820 and the orientation computation of step 830.

In step 821, the entire image is divided into blocks, e.g., 8×8 pixels. Then the orientation of each pixel in the block is determined in 822 by selecting a direction as follows: at the given pixel, a number of pixels are selected along a line segment of an orientation and prespecified length centered around that pixel; variation in the intensities of the selected pixels is then determined by computing the sum of intensity differences between the given pixel and the selected pixels; the orientation at a pixel is the orientation of the line segment for which the intensity variation thus computed is minimal. In a preferred embodiment, four directions are used: 0, 45, 90, and 135 degrees (with respect to a given frame of reference). Similar methods are well known, and are explained by Mehtre in the article mentioned above.

In step 823, the intensity along each direction from the pixel is novelly used to determine whether the pixel is part of the foreground or part of the background. In other words, the intensity variations along selected directions containing each of the given pixels is used to segment the fingerprint image from the background.

Figure 9:
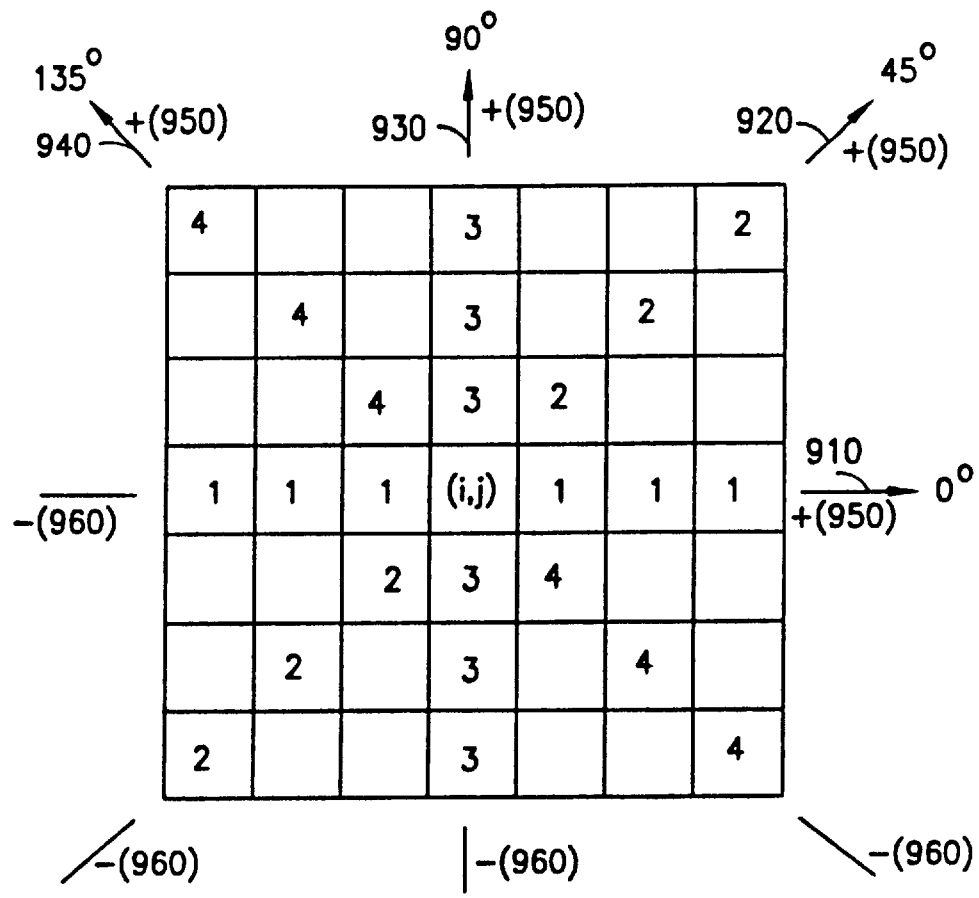
FIG. 9 is a figure showing the sets of neighboring pixels for four directions.

Regions of background and areas of leftover impressions (e.g., those impressions having faint residual portions of different fingerprints captured earlier on a dirty input device) usually exhibit small intensity variation around their neighborhoods. To determine whether a pixel belongs to the background, step 823 first computes the intensity differences, $D_d$, between the pixel of interest and its neighboring pixels along the (four) directional lines, e.g., in a preferred embodiment d=0, 45, 90, and 135 degrees, respectively, and the intensity difference is determined as follows:

$$D_d = \Sigma\{|f(i,j) - f_d(i',j')|\}, d=0, 45, 90, 135$$

where $f(i,j)$ is the intensity of pixel (i,j) and $f_d(i',j')$ are the intensities of the neighbors of pixel (i,j) along the d direction. This indicates the summation of differences between the given pixel of interest, pixel (i,j), and a number n, e.g. 6, neighboring pixels along each of the directions. FIG. 9 illustrates the neighbors of pixel (i,j), where pixels labeled as 1, 2, 3, 4 correspond to neighbors on the directions 0 (910), 45 (920), 90 (930) and 135 (940) degrees, respectively. Note that in this embodiment, three neighbor pixels are selected in each of the positive (950) and negative (960) directions along each of the 0, 45, 90, and 135 degree directions/paths.

The intensity variation D at the pixel of interest is then obtained by summing up the differences in the four directions, e.g., all 24 differences, as follows:

$$D = \sum_d D_d; \quad d = 0, 45, 90, 135$$

A comparison 824 is made to determine whether the pixel's summed intensity difference 823 is greater or less than a background threshold. The pixel is classified as a background pixel 826 if the summed intensity variation D 823 is less than the background threshold. The pixel is classified as a foreground pixel 825 if the summed intensity variation D 823 is more than the background threshold. If the intensity variation is equal to the background threshold, one of the branches (825, 826) is consistently taken. In a preferred embodiment, the value of the background threshold is set to 120.

Subsequently, for a block of fixed size, say N by N (in a preferred embodiment, N is set to eight), step 827 determines whether the block of interest belongs to the foreground of a fingerprint image. The criterion is that if less than certain block threshold amount of pixels within the block are in the background, the block is marked as foreground 829. If the block contains more than the block threshold of pixels in the background, the block is marked as background 828. In a preferred embodiment, if more than five percent of the block's pixels are background, the block is marked as background. Otherwise, the block is marked as a foreground block. Background blocks are not considered in the rest of the processing, e.g., the remaining orientation computations 830/830A.

Optionally, the segmentation can have additional features. In one preferred embodiment, step 827 examines the blocks in the neighborhood surrounding the given block before marking the block as foreground/background rather than performing the above foreground extraction scheme on each block independently. If all the neighbors surrounding the given block are marked as foreground (background) then the given block is also marked as foreground (background). In a preferred embodiment, a 3 by 3 neighborhood of blocks around the given block is considered.

Optionally, step 827 can perform an area-based test to determine if the fingerprint image (foreground) is too small. If the area of the segmented foreground is less than a desired size (in a preferred embodiment, the desired size is twenty percent of the total image size), the fingerprint image is immediately rejected because it is too small. The fingerprint image is then said to be of poor quality because of the small area it occupies, no matter if it is dry.

Referring back to FIG. 8, step 840 determines whether there is a block direction (as described above) or not. If there is a block direction, i.e., a prominent direction, the direction is noted, and the block is marked as having a prominent direction, e.g., with a binary value of 1. If the block has no prominent direction, as determined above, the non-directional block is also marked, e.g., with a 0.

After the foreground blocks are marked, step 840 (FIG. 8) determines whether the resulting direction for each block is prominent. The idea is that a block with a prominent direction should exhibit a clear ridge/valley direction which is consistent with most of the pixel directions. On the contrary, a block with no direction does not convey any consistent directional information. Specifically, step 840 first computes the directional histogram, for each block, based on the directions of pixels within it. Then if the maximum value of the histogram is greater than a prominent threshold $T_1$, the block is said to have a prominent direction, and is labeled as such. In addition, bifurcations of ridges may result in two prominent directions in a block. Therefore, if two or more directions of the direction histogram are greater than a bifurcation threshold, $T_2$, the corresponding block is also labeled as having a direction. Typically, the bifurcation threshold, $T_2$, is less than the prominent threshold, $T_1$. Accordingly, step 840 generates a binary image with blocks having prominent directions being labeled as 1, while the others having no prominent direction, being labeled as 0.

Up to step 840, the decision as to whether a block conveys a consistent directional information is made independently, i.e, on a block by block basis. However, it is desirable to remove "noise" from the obtained binary image by taking into account the properties of the neighboring blocks. Steps 850 and 860 play such roles in our fingerprint image quality checker. Specifically, step 850 performs postprocessing to remove blocks which are inconsistent with their neighbors. If a "directional" block is surrounded by "non-directional" blocks, it is relabeled as a non-directional block. Similarly, a non-directional block being surrounded by neighboring directional blocks is changed to a directional block.

For example, an optional post-processing step 850 examines all the blocks in a neighborhood of a given block to determine if all of the blocks in the neighborhood are marked as having a direction (no direction). If the given block is marked as having no direction (a direction) and all of the blocks in the neighborhood are marked as having a direction (no direction), the marking of the given block is changed to that of having a direction (no direction.) In a preferred embodiment, the blocks in the neighborhood are those that are adjacent to the given block and form a 3×3 matrix of blocks around the given block. For example, if the given block is marked as having no direction and all the blocks in its neighborhood are marked as having a direction, the given block is marked as having a direction.

Step 860 determines the connectivities of the blocks using a connected component analysis based on Dana H. Ballard and Christopher M. Brown, Computer Vision, 1982, Prentice-Hall, Inc., Englewood Cliffs, N.J. 07632 of which chapter 5 is herein incorporated by reference in its entirety. Step 860 determines which blocks have a direction and are contiguous with other blocks that have a direction. (Note that the directions do not have to be the same.) Once these contiguous regions of blocks with directions are found, the number of blocks in each contiguous region is determined. The blocks in contiguous regions have fewer than a region threshold number of blocks, i.e., a region threshold, are discarded for the purposes of the remaining steps in this process 800. This is because regions with small areas, i.e., with fewer than the region threshold number of blocks, i.e. a region threshold, are assumed to be noisy. In a preferred embodiment, the region threshold number of blocks is 10. The end result is that the fingerprint foreground image is partitioned into regions of contiguous blocks with direction and blocks without direction or non contiguous blocks with direction.

The quality value of the acquired fingerprint image is determined in step 870. If the computed quality value is small, below a quality threshold, the image is to-be rejected 871. Step 880 subsequently performs a dryness test which examines whether the image 871 is caused by a dry finger or other causes of dryness to provide feedback to the system operator for reference.

After the regions of prominent block directions and large area (greater than the region threshold 860) are identified, step 870 determines the quality of these selected regions of the fingerprint image.

Figure 10:
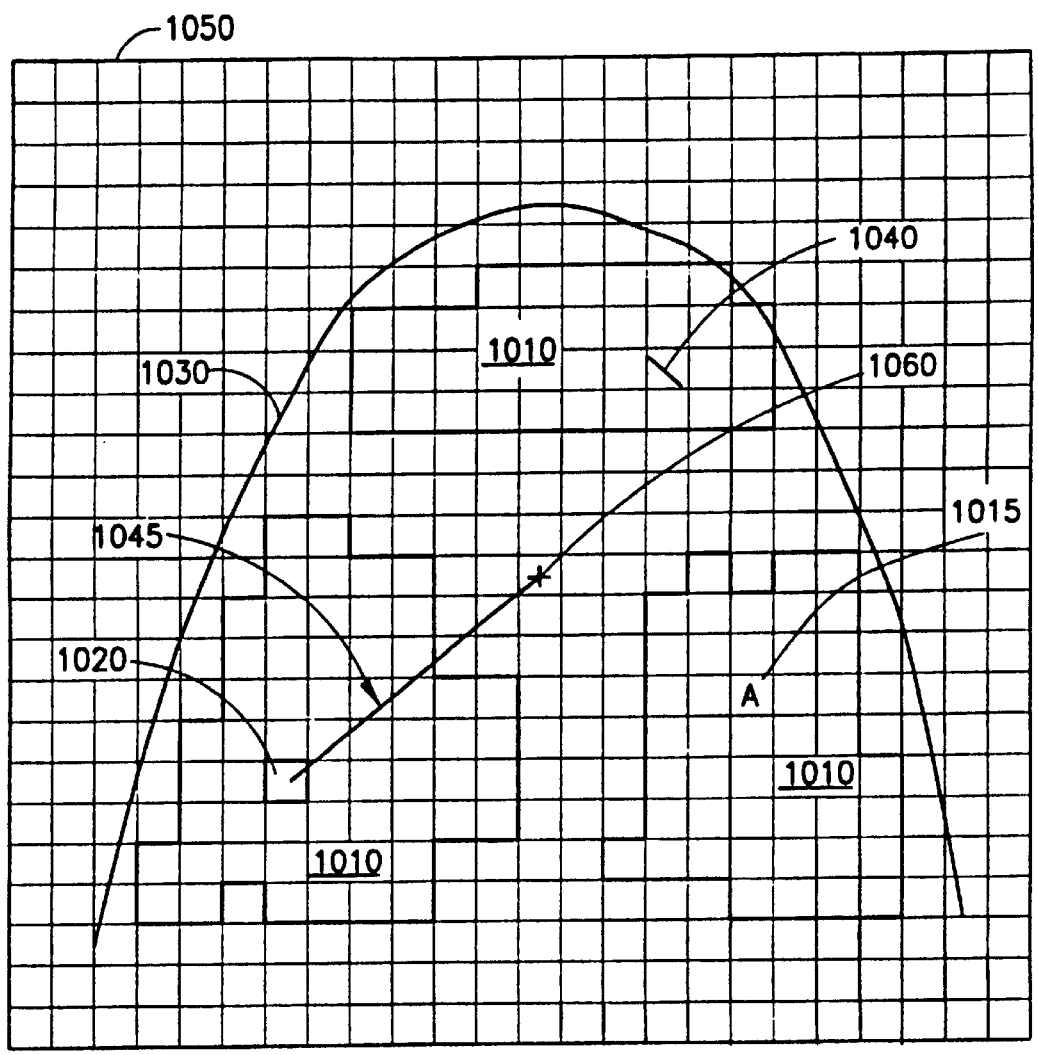
FIG. 10 is an illustration of a fingerprint with directional blocks used in a quality measurement.

Refer to FIG. 10. The quality value computation step 870 selects contiguous regions 1010 of blocks 1020 that have greater than a threshold area 1015 (greater than the region threshold 860), that are in the foreground 1030 of the fingerprint image 1050. Note that in a preferred embodiment, each member block of the region 1010 has its own prominent direction 1040 and the region 1010 is larger than the threshold area 1015, i.e., the region threshold 860 determines the minimum number of blocks in the region 1010. The quality measure is the ratio of the area of all these selected contiguous regions (all the regions 1010) to the total area 1030 of the fingerprint image (i.e., the foreground 1030.)

In a preferred embodiment, the contribution of each of the blocks to the quality measure is weighted by a distance 1045 from a block containing a reference point 1060 (a block of reference) within the foreground. In a more preferred embodiment, the block of reference 1060 is located at the centroid of the foreground.

A preferred embodiment, employs a weighed scheme to determine the quality of the fingerprint image 1050. More emphasis is put on regions 1010 close to the centroid 1060. To do this, a weight is assigned to a block based on the geometric distance 1045 from the block 1020 to the centroid 1060. This is appropriate since regions (or accordingly minutiae) near the centroid are likely to provide more information for the Automatic Finger Identification System (AFIS). Specifically, for foreground block i at location $x_i$, the associated weight $w_i$ is $$w_i = \exp\{-\|x_i - x_c\|^2 / (2q^2)\}$$

where $x_c$ is the centroid of foreground, and q reflects the contribution (relative weight) for blocks with respect to the distance from the centroid. In a preferred embodiment, q is set to five.

In a preferred embodiment, since all of the block have an equal area, the quality (i.e., the ratio of the areas above) of a fingerprint image Q is therefore obtained by computing the ratio of total weights of directional blocks to the total weights for each of the blocks in the foreground 1030, i.e.

$$Q = \Sigma\{w_i, x_i \text{ is a-directional block}\} / \Sigma\{w_i, x_i \text{ is a foreground block}\}$$

The computed quality Q is used as a measure of how much reliable directional information is available for an acquired fingerprint image. If the computed Q is less than the quality threshold, TH, the image is rejected 871.

Many reasons cause the loss of directional information in a fingerprint image. For example, excessive ink results in a smudged impression, insufficient ink leads to a dry impression, etc. It is desirable to be able to identify what type of low quality fingerprint images are captured. Step 880 is therefore designed to identify whether a to-be rejected fingerprint image is dry. The idea is that for a dry impression, there are a relatively large number of "dry" blocks where the contrasts of corresponding neighbors vary significantly.

Figure 8B:
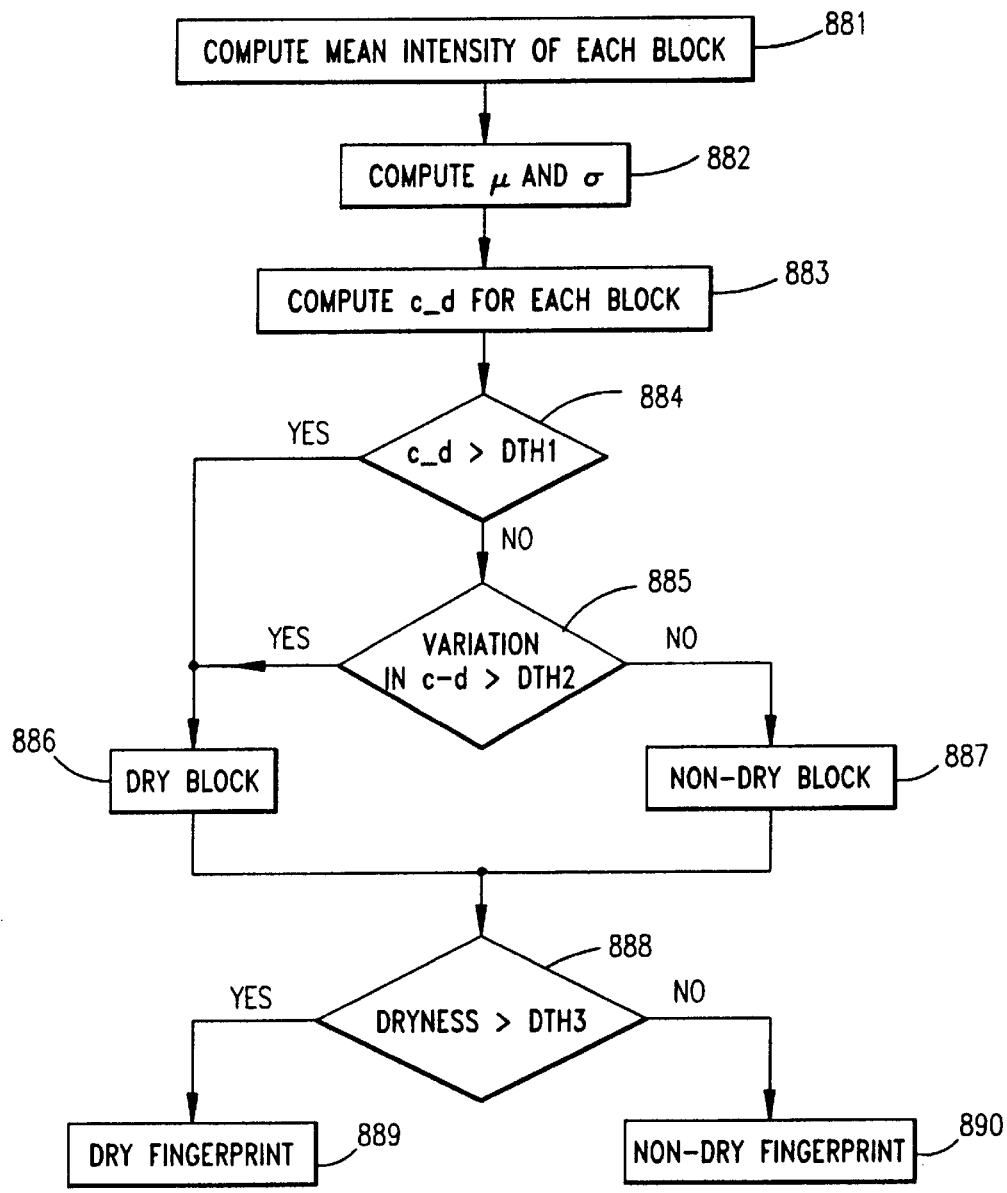
FIG. 8B is a flow chart showing the steps for characterizing whether a poor quality fingerprint image is dry.

FIG. 8B shows the procedures involved in step 880. In step 881, the mean intensity of pixels within each foreground block is computed. For each block, step 882 next computes the mean intensity ($\mu$) of pixels whose intensities are smaller than the mean intensity of all pixels within the block. (The pixels whose intensities are smaller than the mean intensity of all the pixels in the block are considered to be pixels on a ridge, i.e., ridge pixels. Also $\mu$ is assumed to be an approximation of the mean intensity of ridge pixels.) Step 882 also computes the standard deviation ($\sigma$) of intensities of all pixels within the same block.

For a block with good contrast, $\mu$ is small and $\sigma$ is large. But for a block with low contrast due to dryness, $\mu$ is large and $\sigma$ is small. Subsequently, to measure the contrast within a block, step 883 computes the ratio of corresponding $\mu$ to corresponding $\sigma$, i.e., $$C_d = \mu/\sigma;$$

where $c_d$ is the contrast measure. A block is, then, considered to be dry 884 if $C_d$ is greater than a first dryness threshold, DTH1. Alternatively the fingerprint is also considered to be dry if the contrasts of its neighboring blocks vary significantly. Specifically, step 885 compares the difference between the maximum and minimum values of the corresponding set of contrasts 883 to a second dryness threshold DTH2. If the difference is greater than DTH2, then the block is a dry block 886. Otherwise, the block is a non-dry block 887. (In a preferred embodiment, 3 by 3 neighboring blocks are chosen, and DTH2 is between 2 and 4. In a more preferred embodiment, DTH2 is set to 3.5. In a preferred embodiment, DTH 1 is greater than 4.0, more preferably 4.5.) The dryness measure of the image is next computed at step 888 as the ratio of the total number of dry blocks 886 to the total number of foreground blocks 829. If 888 the resulting measure is greater than a third threshold, DTH3, step 880 (FIG. 8) reports that a dry impression 889 causes the quality measure of the image to be poor. Otherwise, a non-dry, but possibly still poor quality (due to other causes) fingerprint image 890 is reported. In a preferred embodiment, the value of DTH3 is chosen to be 0.4.

Given this disclosure alternative equivalent embodiments will become apparent to those skilled in the art. These embodiments are also within the contemplation of the inventors.

We claim:

1. A system for determining whether fingerprint images contain dry impressions comprising:
    a computer comprising at least one central processing unit, at least one memory, and at least one input device;
    at least one fingerprint image having a foreground and a background and being acquired by the input device and stored in the at least one memory, the at least one fingerprint image further comprising a plurality of blocks of pixels;
    a dryness process that operates on said computer for determining a mean intensity of pixels within each foreground block of pixels, for determining a second mean intensity of pixels for those pixels within the respective foreground block of pixels whose intensities are less than the mean intensity, and for determining a standard deviation of intensities of all pixels within the respective foreground block of pixels, wherein a contrast measure is a function of a first ratio of the determined second mean intensity to the determined standard deviation; and
    a comparator that determines that the foreground block of pixels is a dry block if the contrast measure is greater than a dryness threshold, and that further determines that the fingerprint image is a dry image if a second ratio of the number of dry blocks to a total number of foreground blocks is larger than a second dryness threshold.

2. A system, as in claim 1, where the contrast measure is less than the dryness threshold, and wherein the corresponding foreground block is identified as being a dry block if a variation in the contrast measure of two or more neighboring blocks is greater than a third dryness threshold, the neighboring blocks being adjacent to the corresponding foreground block.

3. A system, as in claim 1, wherein said at least one input device is comprised of at least one of a camera, an image scanner, and a second computer connected to a network in common with the system.

4. A system, as in claim 1, where the blocks of pixels comprise down-sampled subsets of pixels from an area on an original fingerprint image.

5. A system, as in claim 1, where the foreground block is not identified as a dry block, but wherein the image is identified as failing a quality criteria.

6. A system, as in claim 1, where the second mean intensity is comprised of a mean ridge intensity.

7. A system for determining whether fingerprint images contain dry impressions comprising:
    a computer comprising at least one central processing unit, at least one memory, and at least one input device;
    at least one fingerprint image having a foreground and a background and being acquired by the input device and stored in the at least one memory, the at least one fingerprint image further comprising a plurality of blocks of pixels;
    a dryness process that operates on said computer for determining a mean intensity of pixels within each foreground block of pixels, for determining a second mean intensity of pixels for those pixels within the respective foreground block of pixels whose intensities are less than the mean intensity, and for determining a standard deviation of intensities of all pixels within the respective foreground block of pixels, wherein a contrast measure is a function of a first ratio of the determined second mean intensity to the determined standard deviation; and a comparator that determines that the foreground block of pixels is a dry block if the contrast measure is greater than a dryness threshold, and that further determines that the fingerprint image is a dry image if a second ratio of the number of dry blocks to a total number of foreground blocks is larger than a second dryness threshold, where the dryness threshold is greater than 4.0.

8. A system, as in claim 1, where the dryness threshold is 4.5.

9. A system for determining whether fingerprint images contain dry impressions comprising:

a computer comprising at least one central processing unit, at least one memory, and at least one input device;

at least one fingerprint image having a foreground and a background and being acquired by the input device and stored in the at least one memory, the at least one fingerprint image further comprising a plurality of blocks of pixels;

a dryness process that operates on said computer for determining a mean intensity of pixels within each forearound block of pixels, for determining a second mean intensity of pixels for those pixels within the respective foreground block of pixels whose intensities are less than the mean intensity, and for determining a standard deviation of intensities of all pixels within the respective foreground block of pixels, wherein a contrast measure is a function of a first ratio of the determined second mean intensity to the determined standard deviation; and a comparator that determines that the foreground block of pixels is a dry block if the contrast measure is greater than a dryness threshold, and that further determines that the fingerprint image is a dry image if a second ratio of the number of dry blocks to a total number of foreground blocks is larger than a second dryness threshold.

where the contrast measure is less than the dryness threshold, and wherein the corresponding foreground block is identified as being a dry block if a variation in the contrast measure of two or more neighboring blocks is greater than a third dryness threshold, the neighboring blocks being adjacent to the corresponding foreground block, where the third dryness threshold is between 2 and 4.0.

10. A system, as in claim 2, where the third dryness threshold is 3.5.

11. A system for determining whether fingerprint images contain dry impressions comprising:

a computer comprising at least one central processing unit, at least one memory, and at least one input device;

at least one fingerprint image having a foreground and a background and being acquired by the input device and stored in the at least one memory, the at least one fingerprint image further comprising a plurality of blocks of pixels;

a dryness process that operates on said computer for determining a mean intensity of pixels within each foreground block of pixels, for determining a second mean intensity of pixels for those pixels within the respective foreground block of pixels whose intensities are less than the mean intensity, and for determining a standard deviation of intensities of all pixels within the respective foreground block of pixels, wherein a contrast measure is a function of a first ratio of the determined second mean intensity to the determined standard deviation; and a comparator that determines that the foreground block of pixels is a dry block if the contrast measure is greater than a dryness threshold, and that further determines that the fingerprint image is a dry image if a second ratio of the number of dry blocks to a total number of foreground blocks is larger than a second dryness threshold, where the second dryness threshold is greater than or equal to 0.4.

12. A system, as in claim 1, where the second dryness threshold is 0.4.

13. A method of detecting a dry fingerprint image comprising the steps of:

selecting at least one foreground block of pixels in a fingerprint image;

determining a mean intensity of pixels for each selected foreground block of pixels;

determining a second mean intensity of all the pixels of the selected foreground block that have an intensity below the determined mean intensity;

determining a standard deviation of the intensities of pixels of the selected foreground block;

marking the foreground block as a dry block if a contrast measure is greater than a dryness threshold, the contrast measure being a function of a ratio of the determined second mean intensity to the determined standard deviation; and identifying the fingerprint image as a dry image if a second ratio of the number of dry blocks to a total number of foreground blocks is larger than a second dryness threshold.

14. A method, as in claim 13, where the contrast measure is less than the dryness threshold, and wherein the corresponding foreground block is identified as being a dry block if a variation in the contrast measure of two or more neighboring blocks is greater than a third dryness threshold, the neighboring blocks being adjacent to the corresponding foreground block.

15. A method for processing an image of a fingerprint, comprising steps of:

obtaining an image of a fingerprint, the image being comprised of pixels;

processing the fingerprint image to partition the image into blocks of pixels each specified to be one of a background block or a foreground block;

further processing foreground blocks to obtain regions each comprised of set of contiguous foreground blocks wherein the pixels of a block exhibit a prominent directionality;

weighting blocks as a function of distance from a common reference point within the fingerprint image;

determining a quality measure for the fingerprint image by computing a ratio of a summation of total weights of blocks exhibiting a prominent directionality to a summation of the weights of the foreground blocks; and directing further processing of the fingerprint image based on the determined quality measure by comparing the determined quality measure to a quality threshold;

wherein if the determined quality measure is less than the quality threshold, the step of directing further processing is comprised of a step of performing a dryness analysis of the fingerprint image;

wherein the dryness analysis comprises steps of, determining a mean intensity of pixels for individual ones of foreground blocks of pixels;

determining a second mean intensity of pixels for the individual ones of the foreground blocks that have an intensity below the determined mean intensity;

determining a standard deviation of the intensities of pixels for the individual ones of the foreground blocks;

marking a given foreground block as being a dry block if a contrast measure is greater than a dryness threshold, the contrast measure being a function of a ratio of the determined second mean intensity to the determined standard deviation; and identifying the fingerprint image as a dry image if a second ratio of the number of dry blocks to a total number of foreground blocks is larger than a second dryness threshold.

16. A method as in claim 15, where the contrast measure is less than the dryness threshold, and wherein the corresponding foreground block is identified as being a dry block if a variation in the contrast measure of two or more neighboring blocks is greater than a third dryness threshold, the neighboring blocks being adjacent to the corresponding foreground block.

17. A method as in claim 16, where the dryness threshold has a value between about 4.0 and about 5.0, where the second dryness threshold is approximately 0.4, and where the third dryness threshold has a value between about 2.0 and 4.0.

18. A method as in claim 15, wherein the common reference point is a centroid of the regions of foreground blocks.

* * * * *